US011281776B2

(12) United States Patent
Todasco et al.

(10) Patent No.: US 11,281,776 B2
(45) Date of Patent: Mar. 22, 2022

(54) DETECTION OF FRAUDULENT DISPLAYABLE CODE DATA DURING DEVICE CAPTURE

(71) Applicant: PAYPAL, INC., San Jose, CA (US)

(72) Inventors: Michael Charles Todasco, Santa Clara, CA (US); Fun-Chen Jou, San Francisco, CA (US); Adhish Vyas, San Jose, CA (US); Megan Marie O'Neill, San Jose, CA (US); Yona Ju, San Jose, CA (US); Shao-Fei Moy, San Jose, CA (US); Haidan Huang, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 323 days.

(21) Appl. No.: 16/459,371

(22) Filed: Jul. 1, 2019

(65) Prior Publication Data

US 2021/0004463 A1 Jan. 7, 2021

(51) Int. Cl.
*G06F 21/56* (2013.01)
*G06K 7/14* (2006.01)
(Continued)

(52) U.S. Cl.
CPC ............ *G06F 21/565* (2013.01); *G06F 21/54* (2013.01); *G06F 21/554* (2013.01); *G06K 7/1417* (2013.01); *G06K 7/1439* (2013.01)

(58) Field of Classification Search
CPC ...... G06F 21/565; G06F 21/54; G06F 21/554; G06K 7/1404; G06K 7/1417; G06K 7/1439
(Continued)

(56) References Cited

U.S. PATENT DOCUMENTS 8,138,923 B2 * 3/2012 Grunwald ............... H04L 63/20
340/572.4
8,296,477 B1 * 10/2012 Polk ...................... G06Q 99/00
710/18
(Continued)

OTHER PUBLICATIONS

Amin Kharraz, "Optical Delusions: A Study of Malicious QR Codes in the Wild", 2014 44th Annual IEEE/IFIP International Conference on Dependable systems and Networks, Jun. 23-26, 2014, pp. 192-203, IEEE.
(Continued)

*Primary Examiner* — Kambiz Zand
*Assistant Examiner* — Mahabub S Ahmed
(74) *Attorney, Agent, or Firm* — Haynes and Boone, LLP

(57) ABSTRACT

There are provided systems and methods for detection of fraudulent displayable code data during device capture. A user may utilize a computing device to capture data at a certain location, such as imaging a QR code or reading an RFID reader. However, without knowing that those codes or devices are safe, the user make risk a computing attack on their device. Thus, processes herein provide a manner to detect when codes or devices are unsafe based on the additional data detected when encoded data is captured. In such instances, those codes and devices may be detected as fraudulent and the user may receive a warning of malicious computing attacks. Additionally, the user may be guided to valid codes and devices to utilize and may further receive information on removing such computing attacks.

20 Claims, 8 Drawing Sheets

(51) Int. Cl.
*G06F 21/55* (2013.01)
*G06F 21/54* (2013.01)

(58) Field of Classification Search
USPC .................................................. 726/22–25
See application file for complete search history.

(56) References Cited

U.S. PATENT DOCUMENTS

| | | | | |
|---|---|---|---|---|
| 8,464,343 | B1* | 6/2013 | Cidambi | G06F 21/51 726/22 |
| 8,485,428 | B1* | 7/2013 | Barker | G06F 21/6218 235/375 |
| 8,490,861 | B1* | 7/2013 | Cidambi | G06F 21/56 235/375 |
| 10,230,705 | B1* | 3/2019 | Joshi | H04L 63/107 |
| 10,943,311 | B1* | 3/2021 | Svenson | G06Q 20/20 |
| 11,062,547 | B2* | 7/2021 | Adelberg | G07F 9/026 |
| 2009/0240735 | A1* | 9/2009 | Grandhi | G06F 16/5838 |
| 2012/0024956 | A1* | 2/2012 | Chen | G06K 19/06037 235/469 |
| 2014/0199663 | A1* | 7/2014 | Sadeh-Koniecpol | H04L 63/145 434/118 |
| 2014/0199664 | A1* | 7/2014 | Sadeh-Koniecpol | G06F 21/563 434/118 |
| 2015/0089642 | A1* | 3/2015 | Di Cocco | H04L 63/1483 726/22 |
| 2015/0206118 | A1* | 7/2015 | Cummins | G06Q 20/3276 705/21 |
| 2015/0302421 | A1* | 10/2015 | Caton | G06F 21/34 705/17 |
| 2015/0348042 | A1* | 12/2015 | Jivraj | G06Q 20/322 705/44 |
| 2016/0171486 | A1* | 6/2016 | Wagner | G06Q 20/3278 705/39 |
| 2016/0255161 | A1* | 9/2016 | Lim | H04L 67/18 455/456.3 |
| 2016/0267369 | A1* | 9/2016 | Picard | G06K 7/1434 |
| 2017/0103674 | A1* | 4/2017 | Sadeh-Koniecpol | H04L 63/1433 |
| 2017/0244746 | A1* | 8/2017 | Hawthorn | G06F 21/55 |
| 2017/0346851 | A1* | 11/2017 | Drake | H04L 63/0428 |
| 2018/0005230 | A1* | 1/2018 | Zovi | G06Q 20/02 |
| 2018/0005315 | A1* | 1/2018 | Rines | H04L 63/1425 |
| 2019/0066064 | A1* | 2/2019 | Liu | G06Q 20/209 |
| 2019/0066079 | A1* | 2/2019 | Liu | G06K 19/06037 |
| 2019/0147159 | A1* | 5/2019 | Eisen | G06K 7/1456 726/17 |
| 2019/0349770 | A1* | 11/2019 | Andres | H04W 12/04 |
| 2020/0005106 | A1* | 1/2020 | Singh | G06Q 20/3827 |
| 2020/0092272 | A1* | 3/2020 | Eisen | G06Q 20/385 |
| 2020/0092701 | A1* | 3/2020 | Arnberg | H04W 8/005 |
| 2020/0104851 | A1* | 4/2020 | Agarwal | G06K 9/00671 |
| 2020/0336895 | A1* | 10/2020 | Bartlett | H04W 12/06 |
| 2020/0349550 | A1* | 11/2020 | Hindocha | G06Q 30/0226 |
| 2020/0403992 | A1* | 12/2020 | Huffman | H04L 63/102 |
| 2021/0112072 | A1* | 4/2021 | Kratzer | H04W 12/77 |
| 2021/0311205 | A1* | 10/2021 | Davidson | G01S 19/421 |

OTHER PUBLICATIONS

Ioannis Kapsalis, "Security of QR Codes", Norwegian University of Science and Technology, 2013, Master in Security and Mobile Computing.

Qrd.by, "QR Code GPS Tracking", 10 pages, [online], [retrieved on Apr. 29, 2019], [Retrieved from the Internet: <URL:https://qrd.by/tracking-qr-code-html5-geolocation>].

QRStuff.com, "Google Maps QR Codes", 6 pages, [online], [Retrieved from the Internet: <URL:https://blog.qrstuff.com/2018/04/15/google-maps-qr-codes>].

OWASP, "QRLJacking", 8 pages, [online], [retrieved on Apr. 29, 2019], [Retrieved from the Internet: <URL: https://www.owasp.org/index.php/Qrljacking>].

Jon Lee, "Is it possible to get geographical location of where QR Code has been scanned?", 4 pages, [online], [retrieved on Apr. 29, 2019], [Retrieved from the Internet: https://www.quora.com/Is-it-possible-to-get-geographical-location-of-where-QR-code-has-been-scanned].

* cited by examiner

DETECTION OF FRAUDULENT DISPLAYABLE CODE DATA DURING DEVICE CAPTURE

TECHNICAL FIELD

The present application generally relates to fraudulent data detection and more particularly to utilizing additional data when a displayable code is captured by a device to determine if the displayable code is fraudulent.

BACKGROUND

Displayable machine-readable codes, such as barcodes or quick response (QR) codes, may be placed in real-world locations to encode data and allow users to access the data through their computing devices. Users may utilize computing devices to image or otherwise capture the displayable code, where an application or process may decode the data from the code and process the data. In some embodiments, the data may include a link to other data, such as a hyperlink to a webpage or other link that fetches online data. However, bad actors may maliciously place codes in areas where users are likely to think the code is valid, such as in a merchant location near a checkout register, or on an item or device that sells items, such as a menu or vending machine. Users may capture the code through their device and may unknowingly risk takeover of their device or being linked to a webpage of the bad actor where the bad actor can phish for user information including credit card numbers and authentication credentials for payment account. Without knowing which displayable codes have been validly placed, users risk many types of computing attacks and may instead refuse to image displayable codes that are validly placed and help to the user and/or merchant.

Figure 1A:
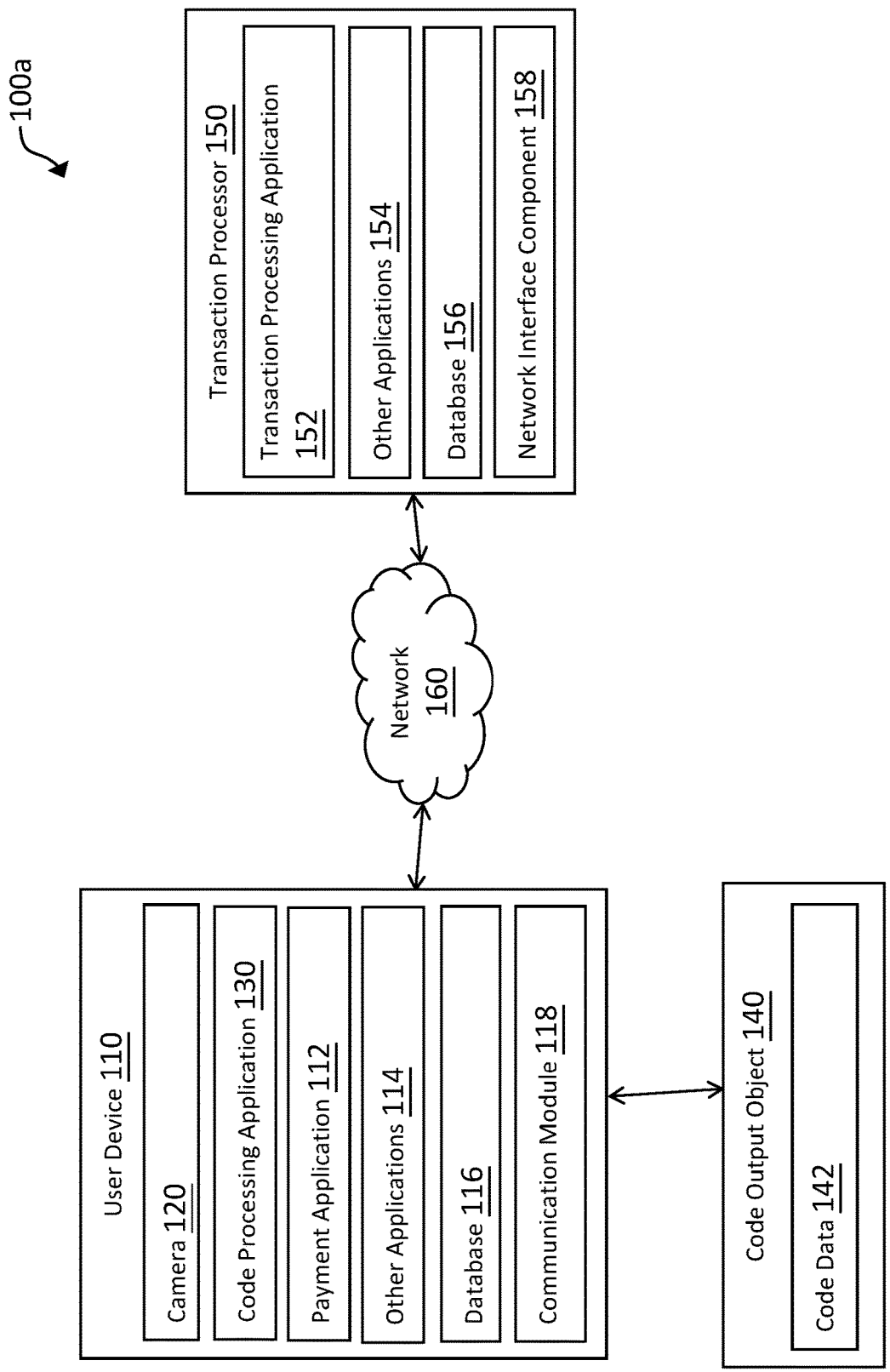
FIG. 1A is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for detection of fraudulent displayable code data during device capture of the code data. Systems suitable for practicing methods of the present disclosure are also provided.

Displayable machine-readable codes, such as barcodes and quick response (QR) codes, may be placed at locations or on objects where users may utilize computing devices, such as mobile phones, to image the codes and retrieve data from the codes. The codes may encode data that may be input and processed by an application, such as data for some executable process. The codes may also include a link or navigation to other online data where additional data cannot be directly encoded into the displayable codes based on a data size. Thus, the user's computing device may decode the data, retrieve linked data, be directed to a website, and/or send the code to a service provider for processing. In some embodiments, the displayable code may be static, such as a code printed on an object or placed on the object using a material or static medium (e.g., a sticker or output by a screen in a static manner). In other embodiments, the displayable code may be dynamic based on an output device that displays the code, such as a display screen displaying the code. Thus, the dynamic code may display a series of codes that change based on a time interval or code refresh interval. The dynamic code may have additional data appended to the code, which is changed when the code changes in a similar fashion to an authentication token mechanism that varies an authentication code for two-factor or similar authentication, such as an RSA token mechanism. However, the dynamic code may not have the appended data or incorrectly appended data, which may be used to detect fraud as discussed herein.

In order to determine whether a displayable code is fraudulent and risks a computing attack when processed by a device, additional data detected when an image of the code is captured is processed. In other embodiments, other encoded data at a location may be processed to determine if the encoded data is fraudulent or risks a computing attack. For example, a radio frequency identifier (RFID) device may include a token or other data that may be captured or received by a device through a passive or active antenna of the RFID device. Similarly, a wireless beacon, such as a Bluetooth or Bluetooth Low Energy device may transmit data wirelessly to devices. The Internet of Things (IoT) may correspond to a broad network of systems, sensors, applications, and devices that function together to monitor real-world data and may also transmit data to devices. Each of these devices and corresponding data may similarly be processed based on additional data, as discussed herein. Thus, a user's mobile computing device may be used to capture, receive, or detect capture data or information, where this includes the image/video or broadcast of encoded data from a displayable code or wireless device.

When capturing an image or broadcast of the code, additional data may also be captured at a time corresponding to the capture data. The additional data may correspond to a geo-location of the device when capturing an image (or video). A time that the device captures the image may also be appended to the image or stored as metadata with the image. Other device sensors may also detect the additional data, including audio or other visual data, ambient lighting, gyroscopic or accelerometer data for a corresponding sensor, a temperature or humidity, or other additional sensed data. The additional data may correspond to metadata that describes or gives information associated with the image. The image may also directly include the additional data, such as background objects within the image and/or nearby the code within the image. An object that the code is on may also be captured, such as a sticker, piece of paper, menu, vending machine, or another object, as well as properties and additional information on or about the object. If the code is dynamic, the screen displaying the code may be detected with a pixel ratio, refresh rate, resolution, or the like. An aspect ratio of the code and/or to the other objects in the image may also be determined. Thus, the additional data may correspond to any contextual data that assists in further describing the capture data of the code or wireless device.

In some embodiments, instead of capturing an image of a code, other encoded data that may be fraudulent may be detected or received by a device. For example, a device may broadcast data or making data wirelessly available, which may also be detected with additional data. Thus, the displayable code or other encoded data may be captured with a location of the code/wireless device, additional objects in the image, a direction the user's device is aimed when capturing the image, a movement of the device when capturing the image, a placement of the code at the location, a material displaying the code, a screen displaying the code, a reflective property of the material or the screen, a refresh rate of the screen, microprinting within the image, an ink color of the code, a resolution of the code, or a hologram within the image. Each of these properties may indicate whether a code and/or device is fraudulent or valid.

In order to determine whether the code/wireless device has been fraudulently placed at the location, the additional data may be processed to determine a likelihood of fraud. This may be based on detection of outlier, incorrect, or suspicious additional data. For example, using the location of the code/wireless device, a database of registered codes/devices at a location may be processed to determine whether that location has one or more displayable codes or devices that provide encoded data. If the location does not have codes/devices, the code/wireless device captured by the user device may be suspicious and indicative of a possible fraudulent device. If a code/wireless device has been registered at the location but the code/wireless device providing the encoded data does not match expected data in a database of registered code(s)/device(s) at the location, then that code/wireless device may be fraudulent. The location data may be used to determine whether placement of the code/wireless device is correct (e.g., expected) within the location, for example, by determining whether the code/wireless device is near an expected location, which may be a registered location (e.g., registering a code at a checkout location) or an intelligently determined location (e.g., by expecting codes to be located at a checkout location and not an aisle in a merchant store or by determining that all past scans or images of a code is at the checkout location). The location of the code/wireless device may also be determined through an orientation, placement, and/or movement of the device while capturing the image/information. For example, a gyroscope or accelerometer may be used to detect an angle of capture of the image of the code, which indicates how high the code is on an object relative to the user. Additionally, a blacklist of past fraudulent codes may also be maintained by the user's device or an online service provider, which may be used to detect fraudulent codes that are captured by a user's device. Thus, locations of past fraudulently detected codes/devices may be determined through the blacklist.

Other types of additional data may also be processed to determine whether the code/wireless device is fraudulently located and placed at the particular location. For example, additional data in an image may be processed. The additional data may include text, images or graphics, and/or objects in the image. If the code is located near text, images/graphics, and/or objects that are expected, such as if the code is printed on a known menu, located on a checkout or point-of-sale registered, or nearby expected objects (e.g., items or furniture in a store), then the code may be determined to be likely valid. However, if the additional text, images/graphics, and/or object are unknown, unfamiliar, or unlikely to be nearby the code, the image of the code may indicate that the code was fraudulently placed/displayed. In some embodiments, one or more additional text, images/graphics, and/or objects in the image may be learned from past images of the code, which may have been classified as fraudulent code and/or valid codes, or proper placement of the valid codes. The material the code is printed on may also be used to detect fraud or code validity, for example, by determining if the material is what the code should be printed on or displayed through, determining if a hologram, ink, or lettering/format of the code is correct, or otherwise analyzing the material. In some embodiments, an age of the code may be determined based on the image of the code and wear or tear in the image (as well as when the code has past been scanned or the number of times the code has been scanned over a period of time). A front facing camera may also be activated to ensure that the user utilizing the device to image the code or wireless receive data is actually the owner of the device and the device has not been misappropriated and used for fraudulent purposes.

Additionally, if the code is dynamic, the dynamic code that is valid may have a token or identifier appended to the code or encoded with the code. For example, an encoded link may include an alphanumeric authentication token within or appended to the end of the link. This may be matched to an authentication token process that generates a randomized authentication token, such as an RSA authentication token process. Thus, the user's device and/or a service provider may determine whether the appended data is within the code and/or matches the expected appended data. If not, then the dynamic code may be fraudulent. In some embodiments, the code/wireless device may be detected as being fraudulently placed based on a risk assessment or score that provides a numerical likelihood of fraud by a rating or percentage. Thus, a threshold score may be required to be exceeded or met in order to indicate validity or fraud. However, in other embodiments, any improper or inconsistent additional data of the capture data may be sufficient to indicate possible fraud and proceed as discussed herein to protect the user and computing device from a malicious computing attack.

If the capture data indicates fraud, the user's computing device may delay and/or refuse processing and may further notify the user of the fraudulent code/wireless device. The user may be notified through a message displayed with the malicious or fraudulent capture data on the user's device. The message may indicate that the code/wireless device is suspicious or fraudulent and may provide further information on removal of the code/wireless device or where a valid or trustworthy code/wireless device is located. In some embodiments, an augmented reality may also be provided when attempting to capture the code or information from the device. For example, a camera of the user's device may be used to image the code or may be directed at the wireless device such that a viewfinder interface of the user's device shows an environment having the code/wireless device. The camera may be used to show a real-world image or video of the code/wireless device. If fraudulent, the output display may indicate the fraud with a layover graphic or text indicating the possible or detected fraud and malicious code/wireless device. The camera of the user's device may also capture the real-world environment of the location, such as a vending machine area or merchant location, and may provide clues, instructions, or directions on the proper placement of the code/wireless device, such as arrows or text that shows where the user should be directed to find the valid or trustworthy code/wireless device. The data for the augmented reality may be stored by the device and/or received from a service provider when the device operates at the location.

In some embodiments, the displayable code and/or the information from the display device (or the device itself) may be added to a blacklist of devices so that the harmful data is not later processed by the user's device or another user's device. The blacklist may be maintained by the device or by a service provider in order to prevent processing of codes or device transmitted information by other devices and/or the service provider. The blacklist may also include malicious actors and common displayable code formats and/or devices for use in determining other fraudulent codes/devices. An administrator or authority figure associated with the location, such as a merchant, location owner, vending machine owner/operator, authority enforcement officer, or other entity, may be alerted of the fraudulent code/wireless device and the location of such code/wireless device for removal and/or determination of the malicious actor. The additional data may be provided with the image of the code, such as a location of the code/wireless device, so that the administrator may determine how to properly remove the fraudulent code/wireless device. In some embodiments, removal instructions by the user may be displayed such as instructions for removal or destruction of a code, disposal of a device, or other information.

In some embodiments, the risk score or assessment may indicate fraud, but is not dispositive that the code or information from the device is malicious. In such embodiments, a quarantined environment on the user's computing device or with a service provider server may be used to process the code/information and determine whether the data from processing is linked to fraud or further indicates fraud. For example, a sandboxed environment or other computing environment/architecture may be used to process data, input the data to another process, or open/navigate to a link that is encoded in a displayable code or received from a device. A link expander may be used to see a full link and determine if the full link indicates fraud or is for a valid website or webpage (e.g., not a phishing webpage or one that includes a malicious process). The user's device or the service provider may determine if the data risks an account or device takeover operation, attempts to phish for data by requesting sensitive information entry, or otherwise risks an automated computing attack. If so, the code/wireless device may be determined to be fraudulent. However, if not, the data from the code/wireless device may be processed as safe.

Thus, in some embodiments, the capture data may be valid or trustworthy so that the displayable code or information from the wireless device may be processed by the user's computing device. The capture data may include information necessary for a transaction or purchase, such as vending machine data or merchant data put into a payment application or accessible through a link. A service provider may allow for transaction processing on the user's device using an account and the capture data. The transaction processing service may provide account, account management, and/or additional services, including electronic transaction processing for online transactions with merchants and service providers. For example, the transaction processor may provide payment services to an account of a user so that the user may send and receive data to process a transaction. During creation of the account, the user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. The user may select an account name and/or provide authentication credentials, such as a password, personal identification number (PIN), answers to security questions, and/or different authentication information. However, not all information may be necessary in all embodiments.

In this manner, one or more processes may be implemented to assist in risk prevention and minimize security issues with malicious computing device attacks. This provides an automated process assist in providing increased device and data security so that malicious actors may find utilizing location-based devices more difficult to perform account/device takeovers or otherwise attack computing devices. Moreover, an augmented reality may be provided to assist in detection of valid displayable codes and/or wireless devices so that users are information in a convenient manner of the location of such codes/devices. Using detected data, a blacklist may be generated that allows for quick and easy determination of further malicious computing device attacks on other devices.

FIG. 1A is a block diagram of a networked system 100*a* suitable for implementing the processes described herein, according to an embodiment. As shown, system 100*a* may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server based OS. It can be appreciated that the devices and/or servers illustrated in FIG. 1A may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100*a* includes a user device 110, a code output object 140, and a transaction processor 150 in communication over a network 160. User device 110 may be utilized by a user to perform one or more actions, including capturing of an image of a displayable code or receipt other data from code output object 140. User device 110 may function with transaction processor 150 to determine whether code output object 140 is trustworthy or fraudulent, for example, to perform a payment or process a transaction using transaction processor 150. In this regard, user device 110 and/or transaction processor 150 may process additional data associated with the capture data of code output object 140 to determine that code output object 140 is fraudulent and risks a computing attack on user device 110.

User device 110 and transaction processor 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100a, and/or accessible over network 160.

User device 110 may be implemented as a communication device that may utilize appropriate hardware and software configured for wired and/or wireless communication with transaction processor 150. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS 8), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

User device 110 of FIG. 1A contains a camera 120, a code processing application 130, a payment application 112, other applications 114, a database 116, and a communication module 118. Code processing application 130, payment application 112, and other applications 114 may correspond to executable processes, procedures, and/or applications with associated hardware. In other embodiments, user device 110 may include additional or different modules having specialized hardware and/or software as required.

Camera 120 corresponds to an optical device of user device 110 enabling a user associated with user device 110 to capture or record images, including still and/or video images. Camera 120 may correspond to a digital camera on user device 110, or may more generally correspond to any device capable of capturing or recording an image, video, or other digital media with the capability to capture visual data of the user associated with user device 110, including infrared imaging or other types imaging devices. Camera 120 may include various features, such as zoom, flash, focus correction, shutter speed controls, or other various features usable to capture one or more images of the first user, the second user, and/or other users.

Camera 120 may further be used to display a preview and/or captured image to the second user through another device of user device 110, such as a viewfinder, screen (e.g., mobile phone screen), or other display. Camera 120 may interface with one or more applications of user device 110 for the purposes of capturing images, videos, and/or other visual data of the user associated with user device 110, for example, during display of an augmented reality determined by code processing application 130 based on valid or fraudulent code detection and placement in a real-world environment, as discussed herein. Thus, camera 120 capture data at a location and display areal-world environment of the location through an interface.

Code processing application 130 may correspond to one or more processes to execute software modules and associated devices of user device 110 to process data captured from a displayable code or received from a wireless communication device, determine if the displayable code or wireless device is fraudulent or providing malicious/fraudulent data, and output information to one or more users if the code/wireless device is fraudulent. In this regard, code processing application 130 may correspond to specialized hardware and/or software utilized by a user of user device 110 to first capture data from code output object 140, such as a barcode or QR code displayed at a location, or wirelessly receive data from a wireless communication device, such as an RFID tag or token or a Bluetooth or BLE beacon device. The capture of code data 142 from code output object 140 may be performed using camera 120 and/or communication module 118. Code output object 140 may correspond to a displayable code that includes data that may be decoded and processed by user device 110. However, in other embodiments, code output object 140 may instead correspond to a device that wirelessly transmits data. Thus, code output object 140 may include some data that may be captured or detected by user device 110, as discussed herein. The capture data may correspond to an image of the code and/or wirelessly received/detected data. When capturing the capture data, additional data may also be detected, which may correspond to any metadata and/or contextual data of code output object 140. For example, a geo-location or other location data may be detected, including a device orientation, cardinal direction, and/or gyroscope/accelerometer-based data that may be used to determine where the data is captured. A time of the capture data and environmental conditions may also be detected with the captured data. Properties of a material or screen displaying a code and/or shape of the material/screen displaying the code or broadcasting the data may also be captured in the capture data. Thus, additional information in an image may also be captured with the code, some or all of which may be used to determine if the code is fraudulent.

Once the capture data of code data 142 from code output object 140 is detected, code processing application 130 may process the additional data to determine whether the code is fraudulent, or the device is transmitting fraudulent data. In this regard, code processing application 130 may process the additional data and determine a likelihood that the code/wireless device is fraudulent. This may include performing a risk assessment or scoring on the additional data to determine whether the additional data indicates that code data 142 from code output object 140 is fraudulent and placed in the location by a bad actor. The additional data may include a location, time of capture, and/or other environmental data of the capture data from code output object 140, which may be compared to known code/wireless device locations at a time or based on other environmental factors of valid and/or fraudulent codes, as well as expected code/wireless device locations at times or based on other parameters. Code processing application 130 may access a local or remotely stored databased on known and/or expected valid and/or fraudulent code placement information to determine the risk assessment.

Code processing application 130 may also process a layout, placement, or detection of additional objects within the capture data to determine if the code/wireless device is placed at an expected or valid location. For example, a menu at a restaurant or items in a vending machine may be analyzed to determine if the code corresponds to where a merchant registered the code/wireless device as being located. Furniture, people, text, other images or graphics, or other objects in the image may also correspond to the additional data, which may be used to determine if code output object 140 is located at an expected location. Code data 142 may also include appended data from a random number generator or authentication token generator, which may be compared to expected data (e.g., an alphanumeric identifier from an RSA token generator). The token generator may correspond to an application on user device 110 or with transaction processor 150. In some embodiments, code processing application 130 may transmit the capture data having the additional data to transaction processor 150 for processing. Thus, one or more of the processes of code processing application 130 may instead be performed by transaction processor 150.

In the event that code output object 140 is determined to be fraudulent or have malicious data, code processing application 130 may output one or more notifications or alerts of fraudulent data for code output object 140, such as a visual or audiovisual alert in a user interface. In some embodiments, an augmented reality of a real-world environment captured by camera 120 may be output with the alerts or notifications, which may indicate which objects (e.g., code output object 140) are fraudulent using overlaying graphics and may further provide directions within the augmented reality to the valid or trustworthy codes and/or devices. The augmented reality therefore may include one or more graphics and/or alerts overlaid on the real-world environment and with the particular objects in the real-world environment. Additionally, code processing application 130 may provide information on removal of code output object 140 to the user associated with user device 110. However, in other embodiments, the capture data of code output object 140 may be transmitted to an administrator, merchant, or authority entity for removal of code output object 140. Additionally, in some embodiments, code processing application 130 may also display notifications of valid or trustworthy codes and/or devices within the augmented reality or through one or more notifications or alerts.

Payment application 112 may correspond to one or more processes to execute software modules and associated devices of user device 110 to process electronic transactions over a network with one or more other services and/or users, including an electronic transaction using data from a valid or trustworthy code or device at a location that is verified using code processing application 130. In this regard, payment application 112 may correspond to specialized hardware and/or software utilized by a user of user device 110 that may be used to access a website or an interface of a merchant or service provider that allows user device 110 to enter or receive transaction data, provide an account, financial data, or a digital token used to pay for the transaction data, and instruct transaction processor 150 to perform transaction processing. Payment application 112 may utilize one or more user interfaces, such as graphical user interfaces presented using an output display device of user device 110, to enable the user associated with user device 110 to enter and store financial information.

In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 160, including retrieving website information (e.g., a website for transaction processor 150), presenting the website information to the user, and/or communicating information to the website. However, in other embodiments, payment application 112 may include a dedicated application of transaction processor 150 or other entity (e.g., a merchant), which may be configured to assist in processing transactions electronically. The interface(s) providing by payment application 112 may be utilized to engage in electronic transaction processing, including online or virtual purchases and/or purchases at a physical merchant location.

Payment application 112 may be used to process data captured from codes or devices at a location. During transaction processing, payment application 112 may be utilized to select payment instrument(s) for use in providing payment for a purchase transaction, transfer, or other financial process. As discussed herein, payment application 112 may utilize user financial information, such as credit card data, bank account data, or other funding source data, as a payment instrument when providing payment information. Additionally, payment application 112 may utilize a digital wallet stored with an account with a payment provider, such as transaction processor 150, as the payment instrument, for example, through accessing a digital wallet or account of a user with transaction processor 150 through entry of authentication credentials. Payment application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant. The digital token may be issued to user device 110, and may authenticate an account, digital wallet, and/or payment instruments to transaction processor 150 and allow for transaction processing and payment using the account, digital wallet, and/or payment instruments.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may include a browser application, dedicated application of a service provider or merchant, and/or financial application. Other applications 114 may also include email, texting, voice and IM applications that allow a user to send and receive emails, calls, texts, and other notifications through network 160. Other applications 114 may also include other location detection applications, which may be used to determine a location for user device 110, such as a mapping application or other application that may function with a GPS sensor or other location services component. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers.

User device 110 may further include or have access to database 116. Database 116 may include capture data of one or more codes/devices, such as code output object 140, which may include additional data determined at the time of detection of an image or receipt of some data from the codes/devices. In some embodiments, database 116 may be local to user device 110. However, in other embodiments, database 116 may be external to user device 110 and accessible by user device 110, including cloud storage systems and/or databases that are accessible over network 160.

User device 110 includes at least one communication module 118 adapted to communicate with code output object 140, transaction processor 150, and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications.

Code output object 140 may correspond to a physical object that may output data detected by user device 110, which may be processed with additional data to determine whether code output object 140 is fraudulent and/or contains malicious data. In this regard, code output object 140 includes code data 142, which may be displayed or output. In some embodiments, code output object is a static object having code data 142 printed or displayed on a material or screen, such as a sticker, tag, paper, card, plastic, or other material that allows for display of a static barcode, QR code, or other encoded data. In other embodiments, code output object 140 may be dynamic and have a screen that can cycle through multiple codes and may encode data into a code, including an authentication token appended or added to other information in code data 142.

In some embodiments, code output object 140 may correspond to a device that may wirelessly transmit code data 142 to other devices within its communication range to code output object 140. In certain embodiments, code output object 140 may also include software components that may interact with the hardware components to facilitate output of data, including displays of codes through a display device, storage of data and use of the data from memory units, and/or transmission of data using a wireless transceiver. In one example where code output object 140 may correspond to valid data used from transaction processing, code output object 140 may be provided by PAYPAL®, Inc. of San Jose, Calif., USA. However, in other embodiments, code output object 140 may be maintained by other service providers or malicious entities that may output data through a static or dynamic output device, including printed data, dynamic visual data of a code, and/or wireless transceiver that may transmit data for receipt wirelessly.

Transaction processor 150 may be maintained, for example, by an online service provider, which may provide electronic transaction processing of transactions, as well as risk assessment or analysis in some embodiments. In this regard, transaction processor 150 includes one or more processing applications which may be configured to interact with user device 110, code output object 140, and/or another device or server to process a transaction. In some embodiments, one or more of the processes to detect fraudulent data of code output object 140 may also be provided by transaction processor 150. In one example, transaction processor 150 may be provided by PAYPAL®, Inc. of San Jose, Calif., USA. However, in other embodiments, transaction processor 150 may be maintained by or include another type of service provider, which may provide authentication services to a plurality of users.

Transaction processor 150 of FIG. 1A includes a transaction processing application 152, other applications 154, a database 156, and a network interface component 158. Transaction processing application 152 and other applications 154 may correspond to executable processes, procedures, and/or applications with associated hardware. In other embodiments, transaction processor 150 may include additional or different modules having specialized hardware and/or software as required. For example, in some embodiments, one or more of the processes of code processing application 130 on user device 110 may be provided and performed by transaction processor 150 instead of or in addition to user device 110.

Transaction processing application 152 may correspond to one or more processes to execute modules and associated specialized hardware of transaction processor 150 to process a transaction, where the transaction may include transaction data generated by user device 110 based on captured data from a code or object, such as code output object 140. In this regard, transaction processing application 152 may correspond to specialized hardware and/or software used by a user associated with user device 110 to establish a payment account and/or issue a token for financial information with transaction processing application 152 by providing personal and/or financial information to transaction processor 150 through code output object 140. In various embodiments, the financial information may include payment instrument information, such as account/card numbers and information. A digital token issued for the financial information and/or an account may be used to send and process payments, for example, by referring to financial information stored in database 156, and processing a payment using the financial information. In some embodiments, the financial information may also be used to establish the payment account. The payment account may be accessed and/or used through a browser application and/or dedicated payment application executed by user device 110 to engage in transaction processing through transaction processing application 152.

In some embodiments, user device 110 may generate transaction data, and may communicate with transaction processing application 152 to process the transaction based on the transaction data. The transaction data may include data from code output object 140, including identifiers and/or item information decoded from code data 142. Transaction processing application 152 may retrieve the financial information for an account associated with user device 110, and may process a payment using the financial information to an account of the merchant associated with code output object 140. Transaction processing application 152 may process the payment, and may provide a transaction history to user device 110 for transaction authorization, approval, or denial. Additionally, transaction processing application 152 may apply any rewards and/or loyalty benefits available to the user to the transaction, where such benefits are not applied directly by user device 110.

In various embodiments, transaction processor 150 includes other applications 154 as may be desired in particular embodiments to provide features to transaction processor 150. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing transaction processor 150, where the user or other users may interact with the GUI to more easily view and communicate information. In various embodiments, other applications 154 may include connection and/or communication applications, which may be utilized to communicate information over network 160.

Additionally, transaction processor 150 includes database 156. Database 156 may also store one or more blacklists of invalid and fraudulent codes or devices, which may be used to determine if code output object 140 is fraudulent. Additionally, expected data, learned data, and/or registered data of where displayable codes and/or wireless devices are located may be stored by database 156, which may be used in analysis of fraudulently placed codes and devices. Although database 156 is shown as local to transaction processor 150, in some embodiments, database 156 may be remote or accessible over network 160, such as cloud storage services.

In various embodiments, transaction processor 150 includes at least one network interface component 158 adapted to communicate user device 110 and/or another device/server for a merchant over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100a.

Figure 1B:
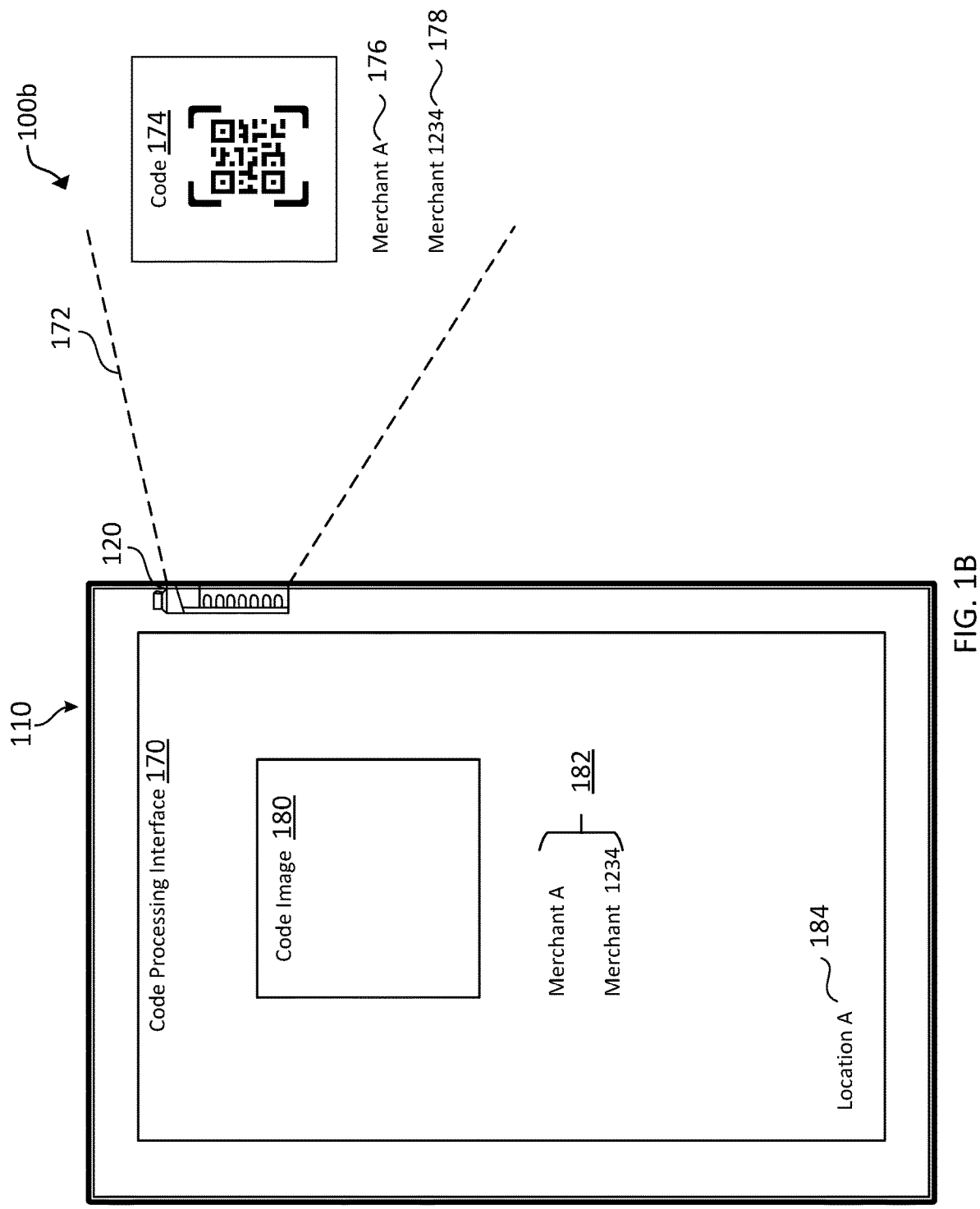
FIG. 1B is an exemplary environment showing a captured image of a code at a location that is processed based on additional data to determine whether the code is fraudulent, according to an embodiment.

FIG. 1B is an exemplary environment showing a captured image of a code at a location that is processed based on additional data to determine whether the code is fraudulent, according to an embodiment. Environment 100b includes user device 110 discussed in reference to system 100a of FIG. 1A. In this regard, environment 100b shows an example of capture data of a displayable code with additional data used to determine if the displayable code is fraudulent.

In environment 100b, user device 110 uses camera 120 to capture an image 172 of a code 174, which is displayed through code processing interface 170. Image 172 is shown as capturing code 174, as well as additional data in image 172. The additional data shows a merchant name 176 and a merchant identifier 178. Thus, when code processing interface 170 displays the capture data of code 174, a user may view a code image 180 and additional data 182 in code processing interface 170. In order to determine whether code image 180 contains potential malicious data (e.g., code 174 is fraudulent), additional data 182 may be processed to determine if code 174 is actually associated with merchant name 176 and/or merchant identifier 178. Merchant name 176 and merchant identifier 178 in additional data 182 may be used to perform a database lookup and compare code image 180 of code 174 to expected appearance of a code associated with merchant name 186 and/or merchant identifier 178. If the comparison matches code image 180 to a code that is registered or learn for merchant name 186 and/or merchant identifier 178, code 174 may be trusted. However, if not, then code 174 may be fraudulent and processing of encoded data in code image 180 may be prevented to stop any unwanted computing attack.

User device 110 further includes a location A 184, which also may correspond to further additional data that is processed to determine if code 174 is fraudulent. For example, location A 184 may be detected by user device 110 when image 172 is captured such that a location of code 174 may be determined. Code image 180 of code 174 may be compared to a database of registered or expected codes at location A 184. If code image 180 is an unknown code and does not match codes in the database for location A 184, or if the database does have any codes for location A 184, code 174 may be marked as fraudulent. Thus, the additional data may include both information in an image, as well as other metadata or information that may describe or be used to further define image 172 of code 174.

Figure 2A:
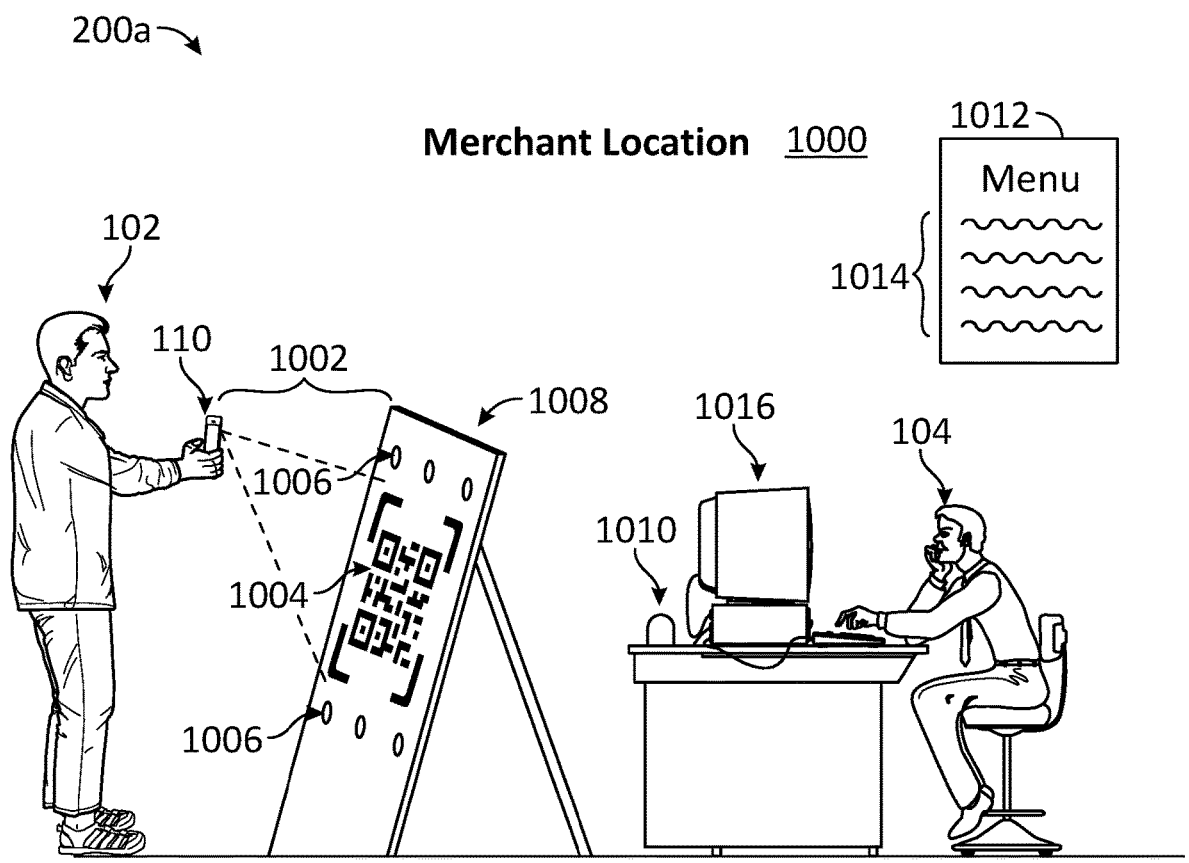
FIG. 2A is an exemplary real-world environment where a user may capture a QR code that is analyzed to determine if it has been fraudulently placed in the real-world environment, according to an embodiment.

FIG. 2A is an exemplary real-world environment where a user may capture a QR code that is analyzed to determine if it has been fraudulently placed in the real-world environment, according to an embodiment. Environment 200a of FIG. 2A includes user device 110 discussed in reference to system 100a of FIG. 1A. Additionally, environment 200a includes a stand 1008 that displays a QR code 1004, where stand 1008 and QR code 1004 may correspond to code output object 140 and code data 142, respectively, in system 100a. Environment 100b displays an exemplary image that may be captured using user device 110 in environment 200a, where a displayable code in an image may be identified as fraudulent based on additional data of the image.

In this regard, in environment 200a, a user 102 using user device 110 may wish to engage in electronic transaction processing for an item at a merchant location 1000, and do so by imaging QR code 1004 to quickly load merchant data and/or access a process to provide a payment to a merchant 104. In particular, user 102 may utilize user device 110 to capture an image 1002 of stand 1008 having QR code 1004 and additional objects 1006 in proximity to QR code 1004, such as located on stand 1008. Image 1002 may be displayed by code processing interface 170 in environment 100b, where code image 180 from environment 100b may correspond to QR code 1004. Image 1002 may also capture additional information at merchant location 1000, including a menu 1012 in a background and/or menu data 1014 in the background. In some embodiments, the data for electronic transaction processing with merchant 104 may instead be transmitted by a wireless device 1010 at merchant location 1000. In such embodiments, image 1002 may not necessarily be captured or image 1002 may correspond to data being recorded and/or displayed on user device 110, such as a visual of merchant location 1000 used with an augmented reality.

When capturing image 1002 of QR code 1004 and/or for use with data received from wireless device 1010, user device 110 may make or receive a risk assessment and determination of whether QR code 1004 and/or wireless device 1010 is fraudulent. In this regard, the additional data, such as the placement and/or location of QR code 1004 and/or wireless device 1010 may be used to determine whether QR code 1004 and/or wireless device 1010 is possibly fraudulent. For example, merchant 104 may register the location of valid codes and devices, which may be matched to QR code 1004 and/or wireless device 1010. If no code is expected to be at the location, QR code 1004 and/or wireless device 1010 may be deemed to be fraudulent. Similarly, the placement and/or proximity of QR code 1004 and/or wireless device 1010 to additional objects 1006, stand 1008, and/or menu 1012 may be used to determine if QR code 1004 and/or wireless device 1010 is expected by located in that area. Thus, the layout of merchant location 1000 and registered or expected codes/devices at the location may be utilized in the determination of fraudulent codes or devices.

In further embodiments, object shape, color, holographic details or print, ink, resolution, quality, and/or design of QR code 1004 and/or wireless device 1010 may also be used to determine if QR code 1004 and/or wireless device 1010 are in an expected design or shape, or whether QR code 1004 and/or wireless device 1010 may have been generated or provided by a bad actor. Invisible or difficult to see print or images may be placed on QR code 1004 and/or wireless device 1010, which user device 110 may pick up using a camera in image 1002. Difficult to copy print, such as holograms may also be placed on valid versions of QR code 1004 and/or wireless device 1010. Thus, the appearance of QR code 1004 and/or wireless device 1010 may also indicate whether QR code 1004 and/or wireless device 1010 are fraudulent.

If fraudulent, user device 110 may refuse to process data from QR code 1004 and/or wireless device 1010, and may also alert user 102 on user device 110. In some embodiments, an augmented reality with image 1002 may be used to indicate that QR code 1004 and/or wireless device 1010 is valid or fraudulent, as well as where valid codes (and/or fraudulent codes) may be located within merchant location 1000. However, if valid, QR code 1004 and/or wireless device 1010 may be used to input data into a transaction processing application of user device 110, and user 102 may proceed with providing a payment to merchant 104. Merchant 104 may also, in some embodiments, see the results and payment for the electronic transaction processing on a merchant device 1016. However, if QR code 1004 and/or wireless device 1010 are determined to be fraudulent based on the additional data (e.g., the other captured data in merchant location 1000, such as the location of stand 1008, additional objects 1006, and/or menu 1012 or other additional data), merchant 104 may view an alert of the fraudulent code/wireless device and may be notified or provided details as to how and where to remove QR code 1004 and/or wireless device 1010.

Figure 2B:
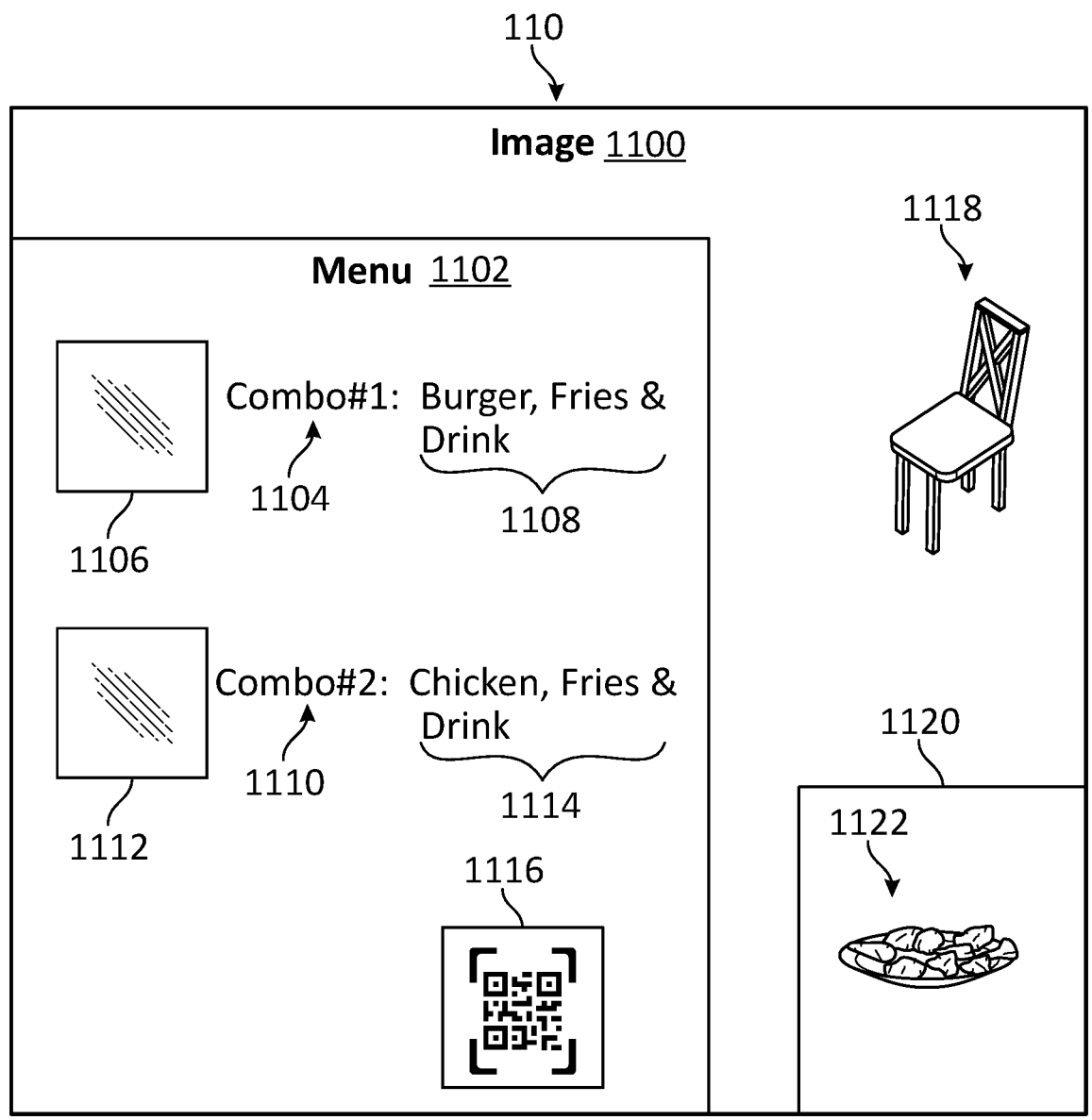
FIG. 2B is an exemplary image of a QR code captured with additional data that may be used to determine if the QR code is safe for processing or fraudulent, according to an embodiment.

FIG. 2B is an exemplary image of a QR code captured with additional data that may be used to determine if the QR code is safe for processing or fraudulent, according to an embodiment. An image 1100 in environment 200b may be displayed by user device 110, which is discussed in reference to system 100a of FIG. 1A. Thus, image 1100 may be captured using camera 120 with one or more applications of user device 110 from system 100a. Image 1100 may therefore correspond to image 172 displayed by code processing interface 170 in environment 100b of FIG. 1B. Thus, image 1100 may include additional data that is used to determine whether a code 1116 in image 1100 is fraudulent.

User device 110 captures image 1100 to determine whether the additional data within image 1100 or detected when image 1100 is captured indicates that a displayable code in image 1100 is potentially fraudulent and includes malicious data. Exemplary additional data in image 1100 may include any other data aside from code 1116 in image 1100. For example, in environment 100b, additional data 182 includes merchant name 176 and merchant identifier 178. Similarly, in environment 200b, other types of additional data in an image is shown. In this regard, image 1100 includes additional data that may be determined from image 1100 to determine whether code 1116 is fraudulent or valid. In image 1100, multiple imaged items or things may be used to understand a layout of a merchant environment by user device 110 or another device, and therefore a placement or location of code 1116 in the merchant environment. Such data may be compared to stored data or expected, learned, or registered locations of valid codes, as well as a blacklist of invalid or fraudulent codes. This allows user device 110 to determine whether code 1116 is fraudulent in the merchant environment.

For example, a menu 1102 may be a physical thing that includes code 1116 printed on menu 1102. In some embodiments, menu 1102 may correspond to a staffed merchant location or an automated merchant location (e.g., a vending machine or computing device that allows automated ordering), where a user may submit payments using user device 110 through loading data using a displayable code. Menu 1102 includes a first item 1104 with a first item image 1106 and a first item description 1108 of a combination food order from a restaurant. Similarly, a second item 1110 having a second item image 1112 with a second item description 1114 may be found on menu 1102. This information may correspond to menu information that may be in proximity to code 1116. Code 1116 may be placed below second item description 1114 on menu 1102, Menu 1102 may have been captured through one or more past images by user device 110 and/or another device, which may have previously been used to determine whether code 1116 is fraudulent or valid, or may have been used to validate code 1116 or add code 1116 to a blacklist (e.g., based on computing attack attempt or success). Based on the layout of the previous images of menu 1102 and/or registered information of placement of code 1116 on menu 1102 or within a merchant location corresponding to image 1100, a risk and/or fraud score of a likelihood of fraud or validity of code 1116 may be determined.

Additional data in image 1100, such as font, color, fading or age, misspelling or of nuanced textual/image data, or other characteristics of the displayed information on menu 1102 may be used to determine if menu 1102 appears as expected or may be fraudulently placed with malicious data for code 1116. This data may be learned from past images of menu 1102 and/or code 1116. In some embodiments, menu 1102 may be static, such as on a printed sign in a restaurant. Thus, menu 1102 may be captured with background information and content or items in image 1100. In this regard, a chair 1118, a stand 1120, and an item 1122 may also be found in image 1100. These similarly may be used to determine if menu 1102 and code 1116 are in an expected area and background content found in proximity to menu 1102 and code 1116 are expected to be located there in image 1100. Thus, chair 1118, a stand 1120, and an item 1122 in image 1100 may further indicate whether code 1116 is fraudulent or valid.

Figure 2C:
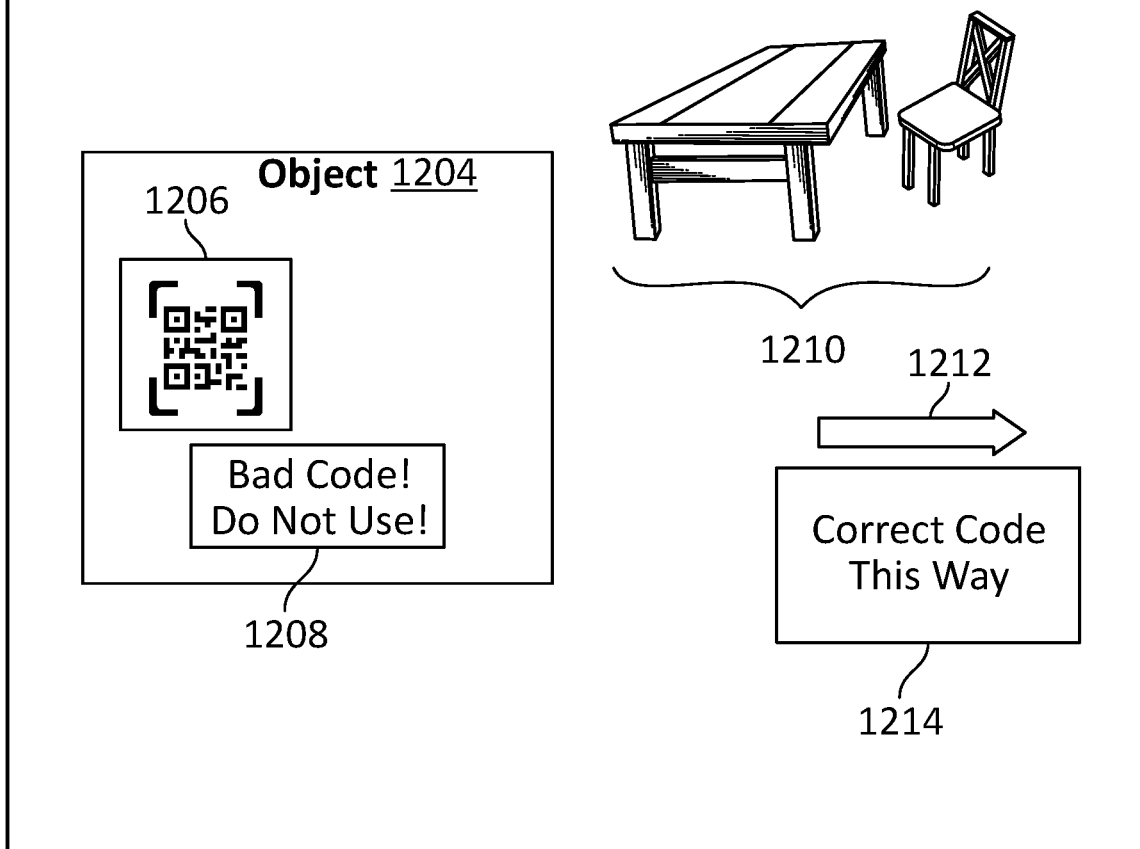
FIG. 2C is an exemplary user interface of a device displaying an augmented reality with safe and fraudulent QR codes from a real-world environment, according to an embodiment.

Additional data, such as contextual data and/or metadata may also be detected and/or captured with image 1100, such as a location of image 1100, time of capture, environmental factors, device orientation of user device 110, and the like. Thus, this additional data not included within image 1100 may also be used to determine if code 1116 is placed in an expected location or position within a real-world environment. In some embodiments, the length and/or number of captures and/or processing of code 1116 may be used to determine whether code 1116 is trustworthy. For example, if multiple other devices have safely captured or processed code 1116 and/or code 1116 has been located at a location for a long time without reports of fraud, code 1116 may be more likely to be valid. If fraudulent, environment 200c of FIG. 2C shows an exemplary augmented reality that may be displayed to a user to alert the user of the fraudulent code 1116. Additionally, user device 110 may transmit an alert to a merchant or administrator associated with the merchant environment in image 1100. Image 1100 may be processed directly by user device 110 for determination of whether code 1116 is fraudulent, or may be transmitted to a service provider and/or transaction processor for the determination and risk analysis of code 1116.

FIG. 2C is an exemplary user interface of a device displaying an augmented reality with safe and fraudulent QR codes from a real-world environment, according to an embodiment. An image capture interface 1200 in environment 200c may be displayed by user device 110, which is discussed in reference to system 100a of FIG. 1A. Thus, image capture interface 1200 may be generated using camera 120 with one or more applications of user device 110 from system 100a.

In image capture interface 1200 of environment 200c, user device 110 displays an augmented reality to warn users of invalid or fraudulent displayable codes or wireless devices in a real-world environment and guide the user to valid devices that do not risk computing attacks against user device 110. In this regard, image capture interface 1200 shows a merchant location augmented reality capture 1202 for the merchant location being captured by user device 110 using a camera. In the merchant location, an object 1204 is located having a code 1206. Additionally, a table set 1210 is also located in the merchant location. Merchant location augmented reality capture 1202 displays a message 1208 that notifies the user of user device 110 that code 1206 on object 1204 is invalid and fraudulent, thereby risking user device 110 from being compromised if code 1206 is captured and processed.

Additional data in image capture interface 1200 and/or detected by user device 110 may be processed to perform the risk assessment of code 1206. If the additional data for code 1206 indicates that code 1206 is fraudulent, then message 1208 may populate that states: "Bad code! Do not use!" This message may be overlaid onto the output of image capture interface 1200 such that an augmented reality is provided with object 1204 to notify the user of fraudulent code 1206. This notifies the user not to attempt to capture and/or process code 1206 through a displayable code processing application. Additionally, the user or another entity may be notified that object 1204 has fraudulent code 1206 on object 1204. In one embodiment, if a code is known to be fraudulent, such as above a certain threshold certainty level, capture mechanisms on the user device may be disabled to prevent capture of the fraudulent code. For example, a camera may have its lens covered or a microphone may have its receiver disabled. This prevents the user from inadvertently capturing the fraudulent code, such as if the user did not notice the alert for whatever reason.

However, the merchant location may have one or more valid codes or devices that may properly provide data for use at the merchant location, such as merchant or item data that may have data for processing a transaction at the merchant location. Merchant location augmented reality capture 1202 therefore provides output in an augmented reality experience that allows the user to view image capture interface 1200 and be guided to the valid code/wireless device. The orientation and/or layout of the merchant location may be determined by user device 110 to properly output directions using object 1204 and/or table set 1210 that are known to be in the merchant location and have the layout. In some embodiments, orientation and/or location of user device 110 may also be used to provide proper direction. Once those directions are determined, a directional sign 1212 may be displayed with a directional message 1214 that is overlaid in an augmented reality experience in image capture interface 1200. The user may then find the valid code/wireless device and may receive the data that does not risk compromising user device 110 to a malicious computing attack or phishing attempt.

Figure 3:
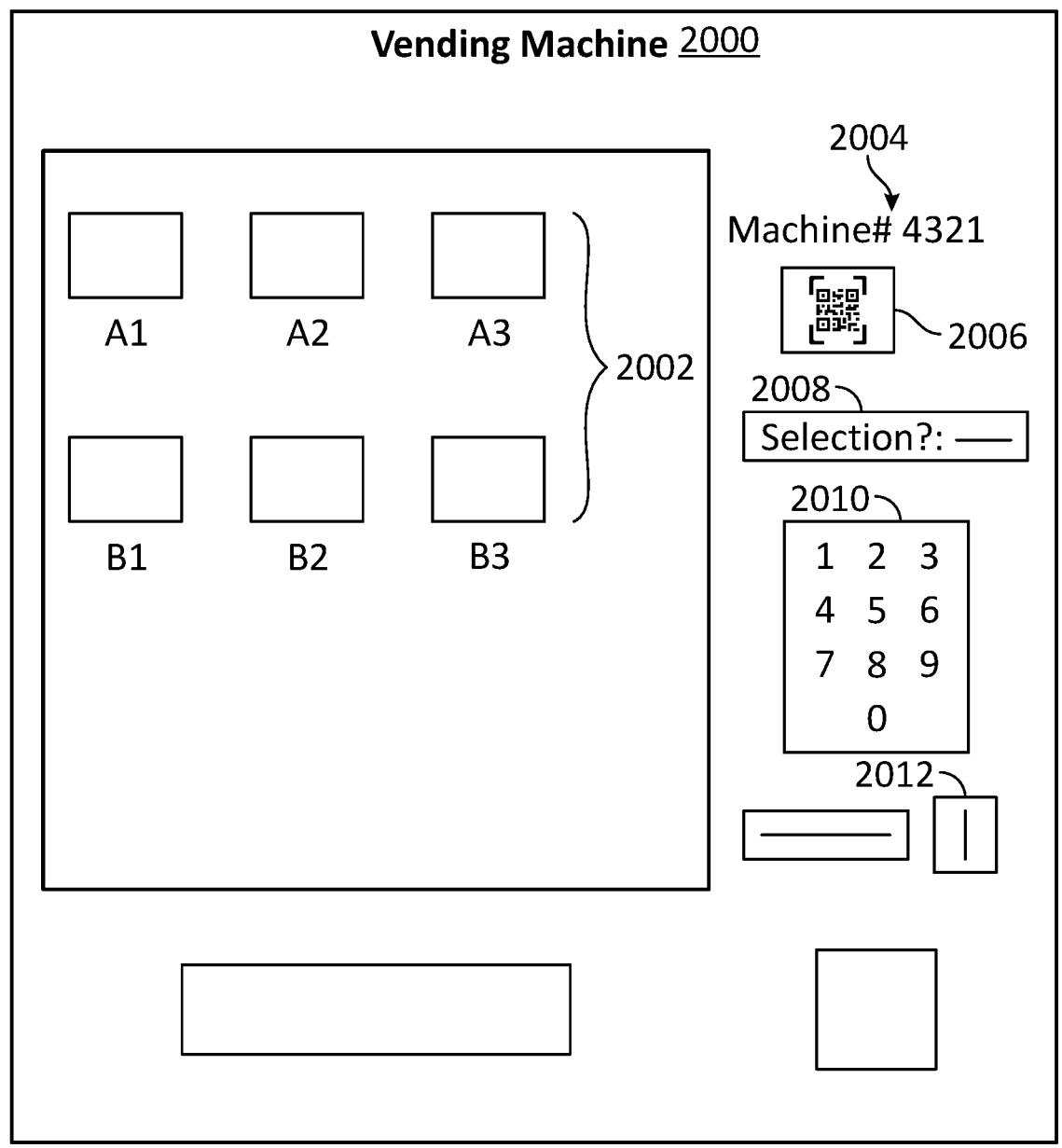
FIG. 3 is an exemplary vending machine system that may display a QR that may be fraudulently placed by a malicious actor, according to an embodiment.

FIG. 3 is an exemplary vending machine system that may display a QR that may be fraudulently placed by a malicious actor, according to an embodiment. Environment 300 includes a vending machine 2000 that may be located at a specific location and utilize a displayable code 2006 intended to assist users in making purchases through electronic transactions, mobile applications, and mobile device cameras. In this regard, displayable code 2006 may correspond to code output object 140 having code data 142 in system 100a of FIG. 1A. Thus, in some embodiments, displayable code 2006 may be fraudulent and have been placed by a bad actor in an attempt to perform some malicious computing attack on a mobile device that images displayable code 2006.

In order to prevent these malicious attacks, a mobile device (e.g., user device 110 in system 100a) may utilize one or more processes to determine whether displayable code 2006 indicates fraud. Vending machine 200 is shown with a particular layout, having items 2002 located within a display and purchase area, as well as having a machine identifier 2004 located in proximity to displayable code 2006. Additional layout elements may also assist in determining whether displayable code 2006 indicates fraud, such as an output screen 2008 allowing a user to make a selection, an input keypad 2010, and a payment mechanism 2012. All of these elements may overall constitute a particular layout that indicates which machine the mobile device is imaging, and therefore what the expected or registered barcode or QR code is for vending machine 2000.

For example, the vendor of vending machine 2000 may have previously requested generation of a particular code, which may be stored in a database of registered codes and used to match displayable code 2006. The mobile device and/or a service provider server may utilize the layout of vending machine 2000, such as the particular types and brands of items 2002 or machine identifier 2004 to determine what the registered displayable code is what is attached to vending machine 2000. This additional data is similarly shown in environment 100b of FIG. 1B. Additionally, a location of the mobile device, detected using a location detection component of the device, may further be used to identify vending machine 2000 and perform a lookup of the registered displayable code based on expected locations of vending machines displaying corresponding codes. If displayable code 2006 does not match the registered code, the displayable code 2006 may be determined to be fraudulent and the mobile device may be prevented from processing encoded data in displayable code 2006. Thus, if the user and/or mobile device is identified as being at vending machine 2000 (e.g., based on a geo-location and/or imaged data surrounding vending machine 2000/displayable code 2006), then an expected code appearance or data may be determined. If displayable code 2006 does not match this expected code, then a flag may be raised that displayable code 2006 is fraudulent. Additionally, the user or the vendor/owner of vending machine 2000 may be alerted to remove displayable code 2006.

Additionally, the particular displayable code appearance and layout for displayable code 2006 may be learned from past image(s) of displayable code 2006 with the layout of vending machine 2000. For example, one or more past users may visit vending machine 2000 and use displayable code 2006 (or another previous code) to make payments to vending machine 2000. If these payments are authorized and no fraud occurs, a learned appearance of an expected code for vending machine 2000 may be determined. This may be stored in a database of expected code appearances matched to locations and/or appearances of vending machines or other objects associated with those codes. Thus, vending machine 2000 may have an expected location, appearance, and displayable code appearance based on these past images. When the mobile device images displayable code 2006 with the appearance and layout of vending machine 2000 (as well as location, in some embodiments), the expected code may be matched to displayable code 2006. If different, displayable code 2006 may be fraudulent and steps may be takes to protect the mobile device and remove the code. However, in embodiments where displayable code 2006 is safe and trusted, such as where displayable code 2006 matches a registered or expected code at a location of vending machine 2000, the mobile device may be authorized or approved to process displayable code 2006 to extract encoded data and process that data. This may include utilizing the data to process a transaction with vending machine 2000 that causes release of one or more of items 2002 and/or linking to a webpage where the user may complete such a transaction.

Figure 4:
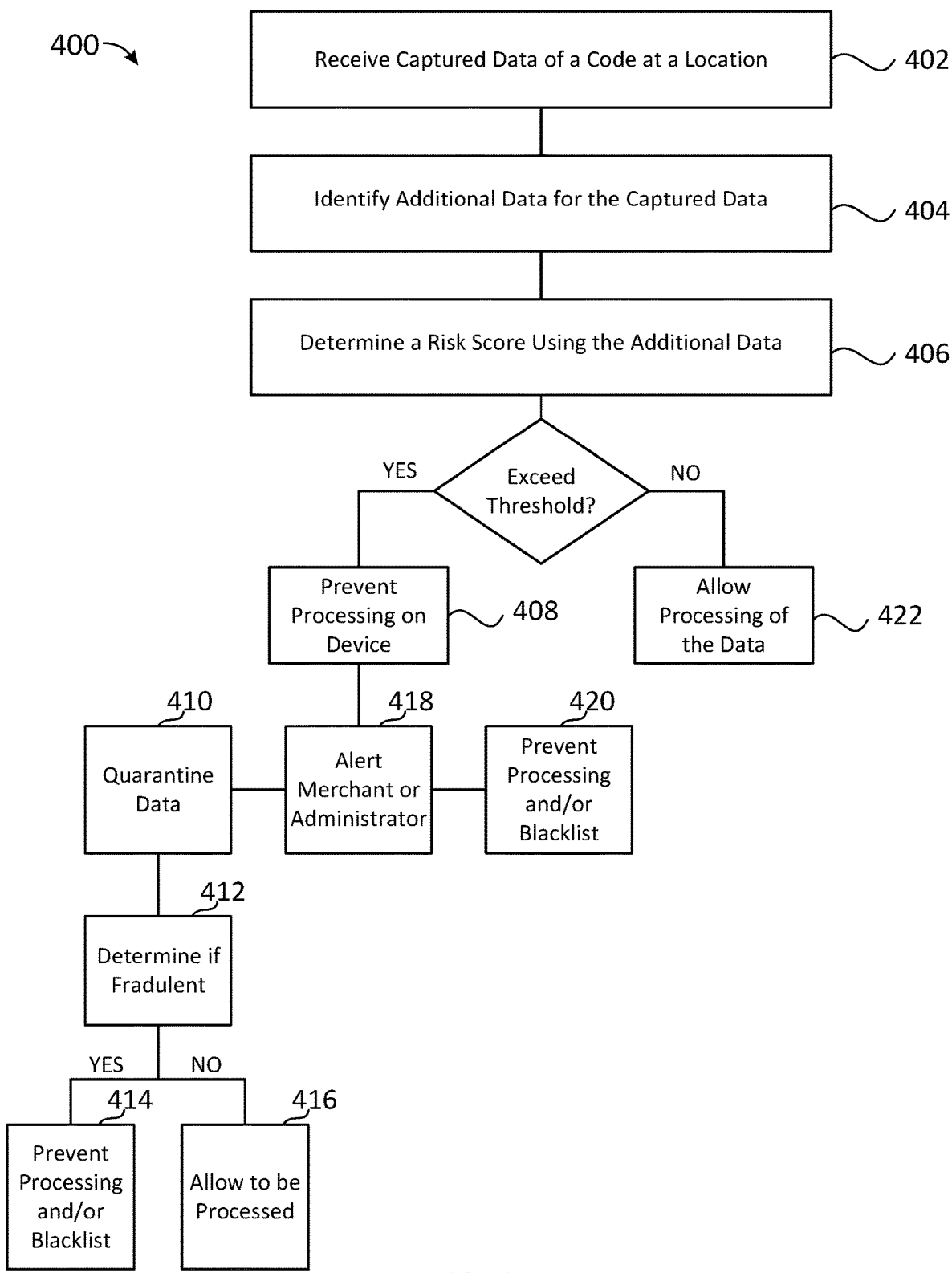
FIG. 4 is a flowchart of an exemplary process for detection of fraudulent displayable code data during device capture, according to an embodiment.

FIG. 4 is a flowchart of an exemplary process for detection of fraudulent displayable code data during device capture, according to an embodiment. Note that one or more steps, processes, and methods described herein of flowchart 400 may be omitted, performed in a different sequence, or combined as desired or appropriate.

At step 402 of flowchart 400, captured data (e.g., an image, video, or received signal transmission) of a code at a location is received, for example, by a user's device or by a service provider server in communication with the device. This device or server processes the additional data detected at a time of capturing the image or signals of the code. The captured data may therefore correspond to an image of the code or signals transmitted by a device of the code, and may also include any additional data that is determined or detected at a time of the capture data, such as a location, time, environment, device parameter, or other visual data of the code or device. At step 404, any additional data for the captured data is identified, which includes contextual data and/or metadata associated with the captured data. The code (or other encoded data that may be fraudulent) is not immediately processed while the additional data can be processed to identify risky or fraudulent codes that may be associated with an attempt at a computing attack. A risk score is then determined using the additional data, at step 406. The risk score may correspond to an assessment, such as a value or quantifier, of the potential for the code to have malicious data, such as a link to a phishing attempt or process that risks device or account takeover, compromising of sensitive data, and the like.

Once the risk score is determined, if the risk score exceeds a threshold risk tolerance or amount, then processing of the code is prevented on the device, at step 408. After step 408, flowchart 400 may proceed through one or more processes. For example, if the risk score indicates potential or actual fraud, then flowchart 400 may proceed to step 410. At step 410, the capture data is quarantined in a protected environment that does not risk compromising other systems of the device or service provider. After quarantine, any code or other encoded data in the capture data is then processed and/or analyzed to determine if the code or encoded data is fraudulent, at step 412. For example, a link expander that prevents navigation to the link may be used. If it is fraudulent, processing of the capture data, such as in an unprotected environment, may be prevented and the code and/or encoded data may be added to a blacklist. However, if the code or other encoded data in the capture data is not determined to be fraudulent, then the capture data may be allowed to be processed by the device such that the device may use the capture data for one or more processes (e.g., electronic transaction processing).

In some embodiments, if the captured data is determined to have a fraudulent code or other encoded data based on the risk score, flowchart 400 proceeds to step 418 where a merchant or administrator is alerted to fix and remove the fraudulent code/wireless device providing that data to the user's device. This may include providing the additional data, or at least the location data, to allow for removal of the code or device at the location. In some embodiments, flowchart 400 may proceed to step 420, where processing of the capture data is prevented, and the encoded data and/or code/wireless device is added to a blacklist to prevent further processing by the user's device or another device/server. This blacklist may therefore be provided by and maintained by an online service provider. However, if the risk score calculated at step 406 does not exceed a threshold amount or score, then flowchart 400 instead proceeds to step 422 where processing of the capture data is allowed, for example, with the user's device or by a service provider that may receive and process the capture data.

Figure 5:
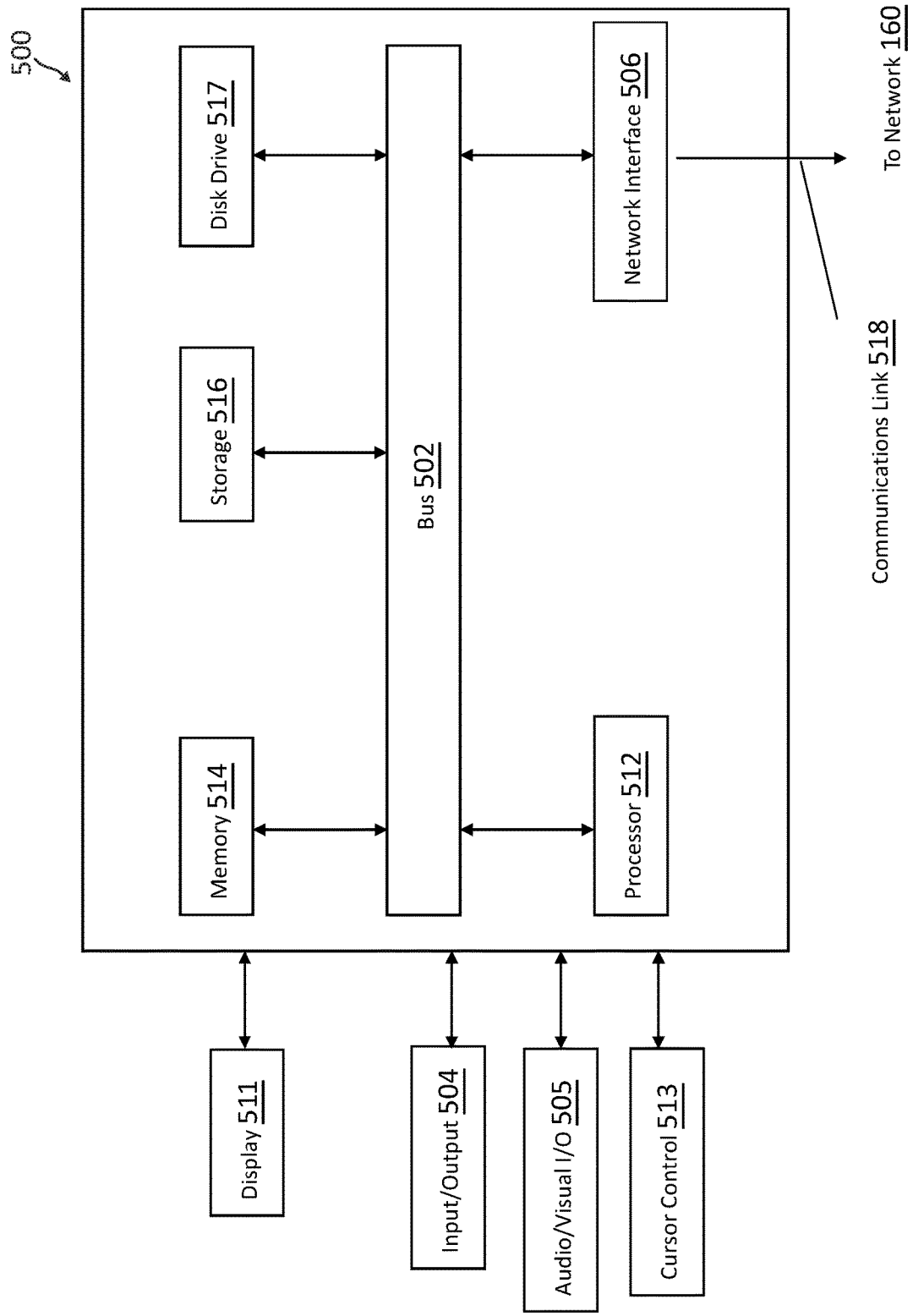
FIG. 5 is a block diagram of a computer system suitable for implementing one or more components in FIG. 1A, according to an embodiment.

FIG. 5 is a block diagram of a computer system suitable for implementing one or more components in FIG. 1A, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors coupled to the non-transitory memory and configured to read the instructions from the non-transitory memory to cause the system to perform operations comprising:
 receiving, from a mobile device of a user, an image of a quick response (QR) code, wherein the image of the QR code comprises data associated with a capturing of the image by the mobile device at a location;
 determining, from the data associated with the capturing of the image, that the QR code is dynamic;
 based on the determining that the QR code is dynamic, determining a series of displayable code data within the QR code;
 determining a risk score comprising an indication of a potential fraud or a malicious computing attack by processing the series of the displayable code data for the QR code based on the image and the data;
 determining a processing action associated with the QR code based on the risk score; and
 executing the processing action.

2. The system of claim 1, wherein the executing the processing action comprises:
 preventing the mobile device from processing the QR code; and
 notifying the user of the risk score in an augmented reality alert associated with the image.

3. The system of claim 2, wherein the executing the processing action comprises:
 alerting an entity associated with the location;
 storing the image of the QR code; and
 providing a subsequent alert based on the stored image and the risk score.

4. The system of claim 1, wherein the executing the processing action comprises:
 approving the mobile device to process the QR code based on the risk score.

5. The system of claim 1, wherein the data comprises one of the location of the QR code, additional information in the image, a direction the mobile device is aimed when capturing the image, a movement of the mobile device when capturing the image, a placement of the QR code at the location, a material displaying the QR code, a screen displaying the QR code, a reflective property of the material or the screen, a refresh rate of the screen, microprinting within the image, an ink color of the QR code, or a hologram within the image.

6. The system of claim 1, wherein the determining the risk score comprises:

identifying at least one additional object in the image; and
determining whether the at least one additional object is associated with the location based on past images captured of at least one of the location or the QR code.

7. The system of claim 6, wherein the at least one additional object comprises one of menu information in a menu displaying the QR code, a layout of the location, or a layout of a machine displaying the QR code.

8. The system of claim 1, wherein the executing the processing action comprises:
   processing the QR code in a first type of computing environment;
   determining whether information from the processing the QR code indicates a threshold probability of risk of the potential fraud or the malicious computing attack; and
   identifying whether the QR code is fraudulent based on the determining whether the information risks the potential fraud or the malicious computing attack.

9. The system of claim 1, wherein the QR code is variable based on one of a time interval or a pattern for the QR code, and wherein the determining the risk score comprises determining whether the QR code matches an expected QR code using a token authentication application.

10. The system of claim 1, wherein the determining the risk score comprises:
    determining that the location is associated with a registered QR code; and
    determining whether the QR code matches the registered QR code.

11. A method comprising:
    receiving, by a service provider from a device, capture information of encoded data associated with an object at a location of the device, wherein the capture information comprises additional data at a time of capture of the capture information by the device;
    determining, from the capture information, that the encoded data dynamically displayed by the object;
    determining a series of displayable encoded code data;
    executing, by the service provider, a risk analysis engine using the capture information and the series of displayable encoded data;
    determining a fraud analysis of the capture information from the risk analysis engine;
    determining, by the service provider, that the fraud analysis is associated with a potential of a data misappropriation or a device takeover by an unauthorized party when the device processes the capture information; and
    preventing, by the service provider, the device from processing the encoded data.

12. The method of claim 11, wherein the preventing the device from processing the encoded data comprises one of blocking a display of information associated with the encoded data, preventing a navigation to the information, or preventing an execution of a computing process using the encoded data, and wherein the method further comprises:
    notifying at least one additional device associated with the location of the object providing the encoded data; and
    blacklisting one of the object or the encoded data from data processing.

13. The method of claim 11, wherein the capture information further comprises data received from one of a QR code, an RFID device, or a wireless transmitter device.

14. The method of claim 11, wherein the additional data comprises one of a physical menu, a physical price chart, or a physical layout of a machine, wherein the encoded data comprises items for sale from the one of the physical menu, the physical price chart, or the machine, and wherein the physical menu, the physical price chart, or the physical layout of the machine is based on past capture data from multiple devices.

15. A computing device system comprising:
    a camera configured to capture image data of one or more objects;
    a non-transitory memory storing instructions; and
    one or more hardware processors coupled to the non-transitory memory and configured to read the instructions from the non-transitory memory to cause the computing device system to perform operations comprising:
    receiving a user request to capture the image data from a user associated with the computing device system;
    capturing the image data of an object at a location using the camera, wherein the image data comprises a displayable code processable by the computing device system, and wherein the image data is associated with additional information detected during the capture of the image data by the camera;
    determining, from the image data, that the displayable code dynamically displayed;
    determining a series of displayable code data;
    determining that the image data is associated with an indication of fraud based on the image data, the additional information, and the series of displayable code data; and
    displaying a notification that the image data is associated with the indication of fraud to the user using a display component of the computing device system.

16. The computing device system of claim 15, wherein the operations further comprise:
    placing the image data in a first type of computing environment, wherein the first type of computing environment prevents encoded data from the displayable code from harming at least one other component or at least one other process on the computing device system; and
    processing the encoded data from the displayable code in the first type of computing environment.

17. The computing device system of claim 15, wherein the image data further comprises an additional object within the image data, wherein the additional information comprises a geo-location of the computing device system, and wherein determining that the image data is associated with the indication of fraud is determined based on at least one of the additional object or the geo-location.

18. The computing device system of claim 15, wherein the determining that the image data is associated with the indication of fraud comprises one of:
    a. extracting data from the displayable code; and
       determining that the data is associated with the indication of fraud,
    b. determining that the object is located at an invalid location for the object based on the image data and/or the additional information, or
    c. transmitting the image data to a service provider; and
       receiving the indication of fraud from the service provider.

19. The computing device system of claim 15, wherein the displaying the notification comprises:
    providing an augmented reality comprising the image data and the object, wherein the augmented reality displays an alert associated with the indication of fraud.

20. The computing device system of claim 15, wherein the displayable code comprises token data appended to the displayable code, and wherein the determining that the image data is associated with the indication of fraud comprises:
  determining the token data appended to the displayable code; and
  determining that the token data does not match expected data using a token generator application of the computing device system.

* * * * *